(12) United States Patent
Mountain

(10) Patent No.: US 8,792,054 B2
(45) Date of Patent: Jul. 29, 2014

(54) AUTOMATIC SUBTITLE RESIZING

(75) Inventor: Dale Llewellyn Mountain, West Yorkshire (GB)

(73) Assignee: Eldon Technology Limited, Keighley (GB)

( * ) Notice: Subject to any disclaimer, the term of this patent is extended or adjusted under 35 U.S.C. 154(b) by 0 days.

(21) Appl. No.: 13/473,379

(22) Filed: May 16, 2012

(65) Prior Publication Data
US 2012/0293712 A1    Nov. 22, 2012

(30) Foreign Application Priority Data

May 19, 2011  (EP) .................................... 11166690

(51) Int. Cl.
H04N 7/00       (2011.01)
H04N 11/00      (2006.01)
H04N 5/44       (2011.01)
H04N 5/445      (2011.01)

(52) U.S. Cl.
USPC ........... 348/468; 348/465; 348/564; 348/561; 348/588; 348/589

(58) Field of Classification Search
USPC .................. 348/468, 553–570, 465, 588, 589
See application file for complete search history.

(56) References Cited

U.S. PATENT DOCUMENTS

| | | | |
|---|---|---|---|
| 5,298,995 | A | 3/1994 | Monta et al. |
| 5,477,274 | A | 12/1995 | Akiyoshi et al. |
| 7,911,536 | B2 * | 3/2011 | Dunton .......................... 348/556 |
| 2003/0189669 | A1 | 10/2003 | Bowser |
| 2006/0061687 | A1 | 3/2006 | Dunton |
| 2007/0022435 | A1 | 1/2007 | Kwon |
| 2007/0253680 | A1 | 11/2007 | Mizote et al. |
| 2009/0002565 | A1 | 1/2009 | Barnhoefer et al. |
| 2009/0162036 | A1 | 6/2009 | Fujii |
| 2009/0228948 | A1 | 9/2009 | Guarin et al. |
| 2012/0281139 | A1 * | 11/2012 | Zhang et al. ................... 348/468 |

FOREIGN PATENT DOCUMENTS

| | | |
|---|---|---|
| CN | 101494741 A | 7/2009 |
| JP | 9046657 A | 2/1997 |
| JP | 2002232802 A | 8/2002 |
| JP | 2004208014 A | 7/2004 |
| JP | 2006165139 A | 6/2006 |
| KR | 20090010494 A | 1/2009 |
| WO | 9417628 | 8/1994 |
| WO | 0122729 A1 | 3/2001 |

OTHER PUBLICATIONS

European Patent Office "Extended European Search Report" mailed Aug. 26, 2011; European Patent Appln. No. 11166690.5.

* cited by examiner

Primary Examiner — Michael Lee
(74) Attorney, Agent, or Firm — Ingrassia Fisher & Lorenz, P.C.

(57) ABSTRACT

A method, apparatus and computer program for displaying video and accompanying text data on a display are provided. The method includes receiving media content that includes video and determining whether text data associated with the video is to be presented on the display alongside the video. If associated text data is not to be presented, then the video content is output as normal, with the video content occupying a first area of the display (such as the entire display). If associated text data is to be presented, then the video output is automatically resized such that the video occupies a smaller area of the display, and the associated text data is automatically displayed alongside the video. By allowing for dynamic resizing it is possible to display subtitles or closed captions alongside portions of video content without obscuring the video.

9 Claims, 4 Drawing Sheets

AUTOMATIC SUBTITLE RESIZING

CROSS-REFERENCES TO RELATED APPLICATIONS

This Application claims priority to European Application No. 11166690.5, filed May 19, 2011.

TECHNICAL FIELD

The following discussion relates to the display of text data, such as closed captions or subtitles, on a display simultaneously with other video information.

BACKGROUND

Subtitles, or other text data in the form of closed captions, are often overlaid on video content so that the text can be read at the same time as viewing the video. Closed captioning refers to any system that receives, formats, and displays text on a television or other display to thereby allow viewers to access additional or interpretive information about programming content. Closed captions may display a transcription of the audio portion of a program as it progresses, thereby allowing the hearing impaired and others to follow the program content without listening to the audio track associated with the programming.

Many broadcast television programmes include closed caption information. For conventional analogue NTSC programming, captions are "encoded" into line 21 of the vertical blanking interval (VBI) of the broadcast signal. For conventional digital (e.g., ATSC) programming, several streams are typically encoded in the digital multiplex, including a set of up to sixty-three caption streams encoded in EIA-708 format. Other closed captioning formats or standards may be implemented in the United States or elsewhere. Generally, the closed caption text is provided with the programming content, and the receiver generates text that overlies the received imagery in a "scrolling", "pop-on" or "paint-on" manner. Motion pictures, video disk (e.g., DVD) content, streamed audio/video, video games and the like may similarly incorporate closed captions using any number of standard or non-standard techniques.

Closed captioning causes a conflict with video display because the text, which may be presented in a surrounding box of some kind, will obscure at least a portion of the video over which it is positioned.

The positioning of the text data may not always be carefully thought out. Typically, subtitles are placed at the bottom centre of the picture as indicated in FIG. 1. This can obscure vital information. For example, in bars or other such venues there are often periods when televisions are displaying video without sound, but there is information displayed within the video picture in this location. Examples of this would be sports shows or news programmes, in which one or more banners, or tickers (sometimes referred to also as "crawlers") or other type of additional information are displayed at the bottom of the screen. Since the sound is turned down it is desirable to allow subtitles or closed captions to be displayed. However, typically this would obscure useful information such as a news ticker.

To avoid obscuring crucial elements of the video display, such as sports scores at the bottom of the screen, the subtitle provider may specify the area of the screen in which the subtitles are to be displayed. However, this can often result in poorer viewing experiences, obscuring other areas of the screen that may also be important.

We have appreciated that it would be advantageous to overcome this and other disadvantages with known systems.

BRIEF SUMMARY

The invention is defined in the independent claims, to which reference is now directed. Additional features are set out in the dependent claims.

Various embodiments provide a set top box (STB) that ignores any placement data provided in the subtitle/closed caption metadata and forces all subtitles/closed captions to be placed in a predetermined location, and then shrinks the picture by a predetermined amount such that the subtitle/closed caption text is displayed on an area of the screen distinct from the video picture. In some implementations, the subtitles/closed captions are displayed at the bottom of the screen, with the video displayed above them. The screen is optionally shrunk whilst maintaining aspect ratio, and may be shrunk by approximately 10%. Embodiments of the invention therefore allow the whole video picture to be displayed along with subtitles/closed captions without obscuring any video. In particular, embodiments allow adaptive or dynamic switching between full screen and reduced sized displays dependent upon whether closed caption text is or is not being displayed.

In the description that follows, subtitles and closed captions will simply be referred to as closed captions, meaning accompanying text data that may be displayed in addition to the normal video picture.

Various embodiments provide a method of displaying video and accompanying text data on a screen or display. The method includes receiving media content, including video content for output to the display and determining whether associated text data is to be presented on the display alongside the video. When it is determined that associated text data is not to be presented the video content is outputted to the display as normal, with the video content occupying a first area of the display, and typically the entire screen (although this may depend upon aspect ratio or the content and the screen). When it is determined that associated text data is to be presented on the display, the video output is automatically resized such that the video content occupies a second area of the display, the second area being smaller than the first area. The associated text data is automatically displayed with the video, the text data being displayed in a third area of the screen. By allowing for dynamic resizing it is possible to display subtitles or closed captions alongside certain portions of video content without obscuring the video.

In various embodiments, the determination as to whether associated text data is to be presented involves determining whether associated text data is present within the media content. If associated text data is not present, the video content occupies the first area of the display, and if associated text data is present, the video output is resized to occupy the second area and the associated text data is displayed in the third area, which is preferably distinct from the second area. The presence or absence of text data may be determined by checking for a tag within the text data indicative thereof.

If associated text data is subsequently determined as not being present, the method further includes waiting a predetermined period of time and, after this time, resizing the output video to occupy the first area of the display, or any other area larger than the second area.

Various embodiments may also provide a corresponding user device, such as a STB, for displaying video and accompanying text data on a display, or providing video and accompanying text data to a display, and configured to undertake the above mentioned method. In one embodiment the device comprises an input for receiving media content, including video content and associated text data and an output for providing the video content and associated text data to the display. The device also includes a closed caption data detector, arranged to determine whether associated text data is to be provided to the display, and a video resize unit arranged to resize the video output to the display. The device is arranged such that when the closed caption data detector determines that text data is not to be provided to the display, video content is output such that it occupies a first area of the display. The device is further arranged such that when the closed caption data detector determines that text data is to be provided to the display the video resize unit resizes the video output such that it occupies a second area of the display, the second area being smaller than the first area, and outputs the associated text data to a third area of the display.

In various embodiments, the closed caption data detector is arranged to determine whether associated text data is present within received media content. If associated text data is not detected, the video content is output such that it occupies the first area of the display, and if associated text data is detected, the video resize unit resizes the video output such that it occupies the second area, which is suitably distinct from the third area. In various embodiments, the closed caption data detector is arranged to detect the presence of a tag within the text data, the tag being indicative of whether associated text data is present or not.

The device may further include a timing unit, or a timer, the device being configured to wait a predetermined period of time before resizing the output video to occupy the first area of the display in the event that the closed caption data detector determines that associated text data is not present.

The invention may be embodied in a computer program that when operated on a user device such as the one described above or below causes it to undertake the method, and any additional extensions of the method, described above or below.

Various embodiments provide a method of displaying video and accompanying text data on a screen or display that utilises a resize indicator. The method includes receiving media content, including video content for output to the display, determining whether associated text data is to be presented on the display alongside the video and determining the status of a resize indicator within the media content, the resize indicator being indicative of whether the video output should be resized. When it is determined that associated text data is not to be presented the video content is outputted to the display as normal, with the video content occupying a first area of the display, and typically the entire screen (although this may depend upon aspect ratio or the content and the screen). When it is determined that associated text data is to be presented on the display, and the resize indicator status is set to resize mode, the video output is automatically resized such that the video content occupies a second area of the display, the second area being smaller than the first area. The associated text data is automatically displayed with the video, the text data being displayed in a third area of the screen. In other words, resizing of the video output may only occur when the resize indicator status is set to resize mode, otherwise the text data is displayed in a conventional manner on an un-resized video output. Such embodiments may include any of the preferable or optional features described above or below.

A corresponding device may be provided wherein the closed caption data detector is further arranged to detect and determine the status of a resize indicator within the media content, the resize indicator being indicative of whether the video output should be resized, and wherein the device is configured to resize the video output only when the resize indicator status is set to resize mode.

BRIEF DESCRIPTION OF THE FIGURES

Embodiments of the invention will now be described with reference to the accompanying Figures in which.

DETAILED DESCRIPTION OF VARIOUS EMBODIMENTS

Several exemplary embodiments will be described in relation to a digitally encoded broadcast, such as MPEG2 or MPEG4 encoded broadcasts, which are then decoded by a STB. Of course it will be appreciated that analogue broadcasts or other types of encoded broadcast can be used. In addition the functionality of the STB may instead be provided directly within the television or display device, or in a standalone unit such as a closed caption decoder device.

Figure 1:
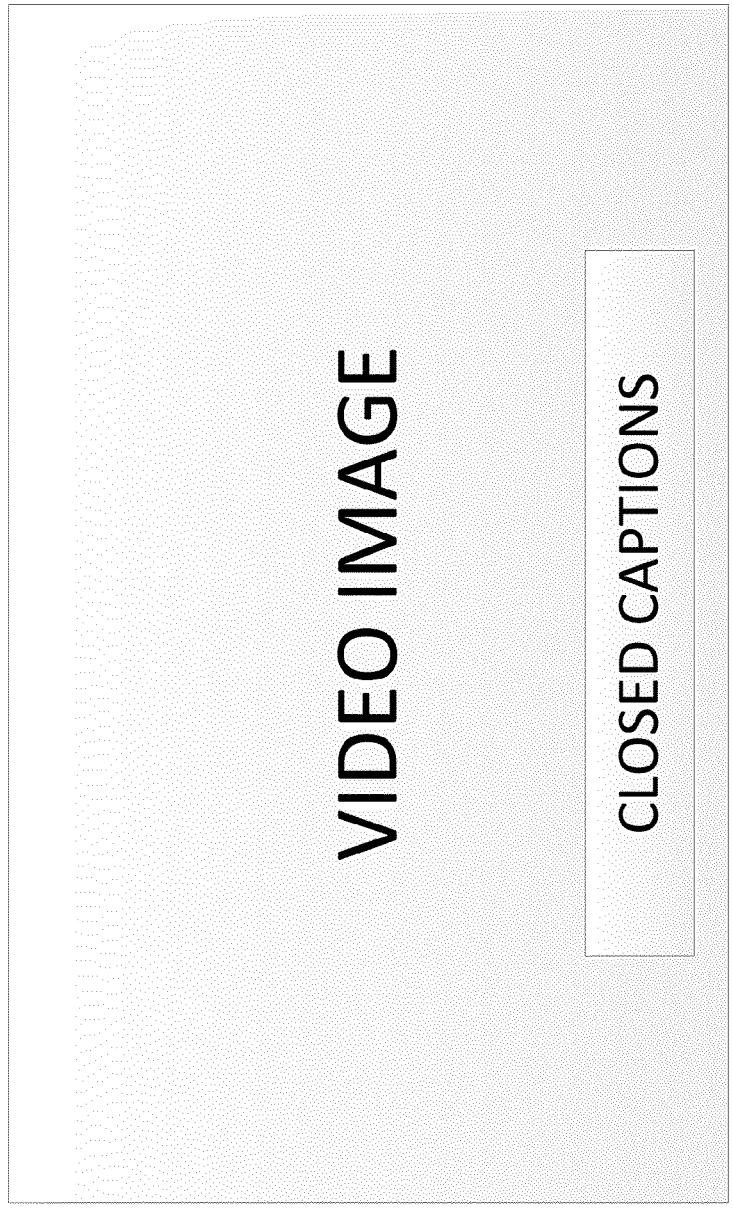
FIG. 1 shows a known layout in which closed captions are displayed over the video.
Figure 2:
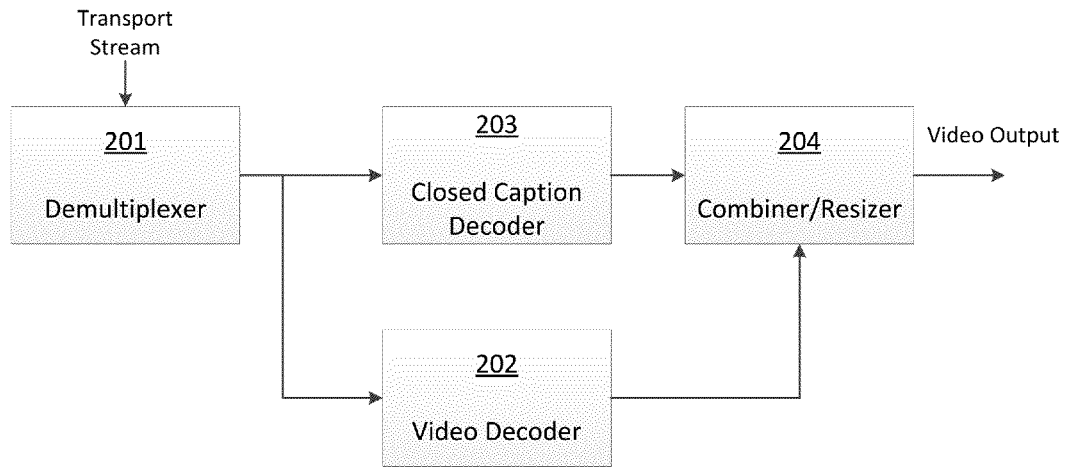
FIG. 2 shows components of a STB according to an embodiment of the invention.

FIG. 2 shows components of a STB according to an embodiment of the invention. It will be appreciated that certain components have been omitted for conciseness. The transport stream, containing media content such as video and audio data as well as other data such as closed captions, EPG data and other metadata, is received by the STB via a receiver (not shown) and provided to a de-multiplexer 201. The de-multiplexer decodes the transport stream so as to extract video data, audio data, and supplementary information. A data slicer (not shown) may be used to extract video and accompanying closed caption data from the transport stream. The video data is passed to the video decoder 202 to decode the MPEG encoded video for subsequent display. Similarly, the closed caption data contained in the transport stream is passed to the closed caption decoder 203 to decode the closed caption information and produce clear text that may be added to the video output. The video decoder and closed caption decoder may be part of the same functional unit.

The combiner/resize unit 204 performs two functions. The video picture size is reduced such that it does not occupy the entirety of the display screen. Also, the closed caption text is combined with the video output, and is positioned such that, when displayed on an output screen, it is positioned in a location that is not occupied by the video picture.

A CPU (not shown) controls the various components, and may be contained on a processor along with one or more of the components described herein.

The combiner/resize unit will only perform the steps above when the user has selected the subtitle or closed caption option, otherwise the combiner/resize functionality is bypassed. The user can select the closed caption display function by providing the appropriate input to the STB, such as via a remote control, in response to which the CPU is arranged to enable or disable the combiner/resize functionality as appropriate. In response to user input indicating that closed caption display is required, the combiner/resize unit 204 will automatically reduce the picture size by a predetermined amount, such as between 5%-15% or more preferably 8%-12%, or even more preferably around 10% when closed captions are to be displayed. The combiner/resize unit will also locate the video picture and the closed captions in different predetermined locations in relation to each other on the output display screen. Preferably, the video picture is located at the top of the screen, in the centre, and the closed captions are located at the bottom of the screen, more preferably at the absolute bottom visible portion of the screen to save space, and also in the centre.

In various embodiments, the resizing of the screen and location of the closed captions are performed automatically by the STB when closed captions are requested by the user and are determined to be present in the transport stream. That is, the system detects that closed captions are required and subsequently automatically resizes the output video picture and automatically places the closed captions in the predetermined locations when the system detects that closed captions are present in the received transport stream. Detection of the presence of closed captions can be performed in a number of ways.

Figure 3:
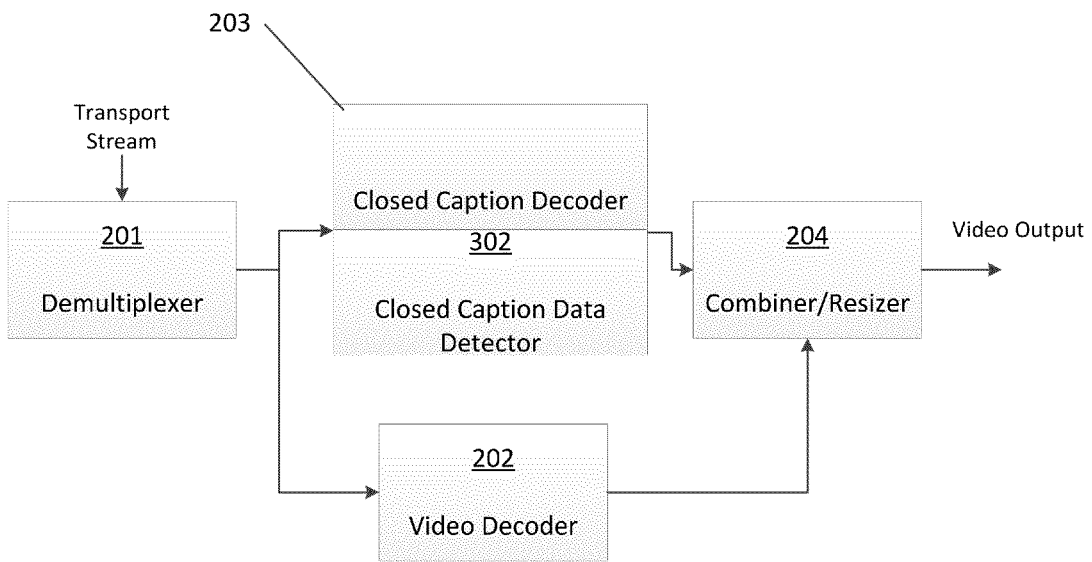
FIG. 3 shows components of a STB according to a further embodiment of the invention.

FIG. 3 shows a further embodiment featuring similar components to that of FIG. 2, with like components having identical reference numerals. The closed caption decoder 203 includes additional functionality provided by a closed caption data detector 302. The data detector 302 is arranged to detect when closed caption data is present. This can be achieved by monitoring the relevant metadata, which may be contained within a program map table (PMT) or event information table (EIT), for example, which contain data indicative of whether closed captions accompany a particular programme or a particular portion of a programme or other media content. The data detector may alternatively check the relevant portion of metadata, for example line 21 of the VBI, containing closed caption text data to check for the presence or absence of text data. Although the closed caption decoder is described with this functionality, in the example of FIG. 2 it may be performed by another component such as the main CPU or a separate dedicated component.

In various embodiments, the closed caption data detector 302 is arranged to bypass the combiner/resize functionality whenever closed captions are not being displayed. This can be achieved by bypassing the combiner/resize unit 204 whenever closed caption data is not present in the transport stream. In particular, this is achieved by determining, for a given portion of video, whether there is closed caption data present during the relevant time code for that video portion. This means that during prolonged periods of video for which there is no accompanying closed caption data (for example during a prolonged action scene during a film) the video is displayed at maximum size. When the dialogue starts up again, and the accompanying closed caption data is detected, the closed caption data detector causes the combiner/resize functionality to be activated again in the manner described above.

In various embodiments, the closed caption data detector contains, or is coupled to, a timer unit and is configured to bypass or deactivate the combiner/resize functionality only if an absence of closed caption data is detected for a predetermined period of time, such as more than 10 seconds, or more than 30 seconds, for example. This prevents the displayed video from constantly resizing between dialogue sections, which might cause annoyance to the viewer.

Figure 4:
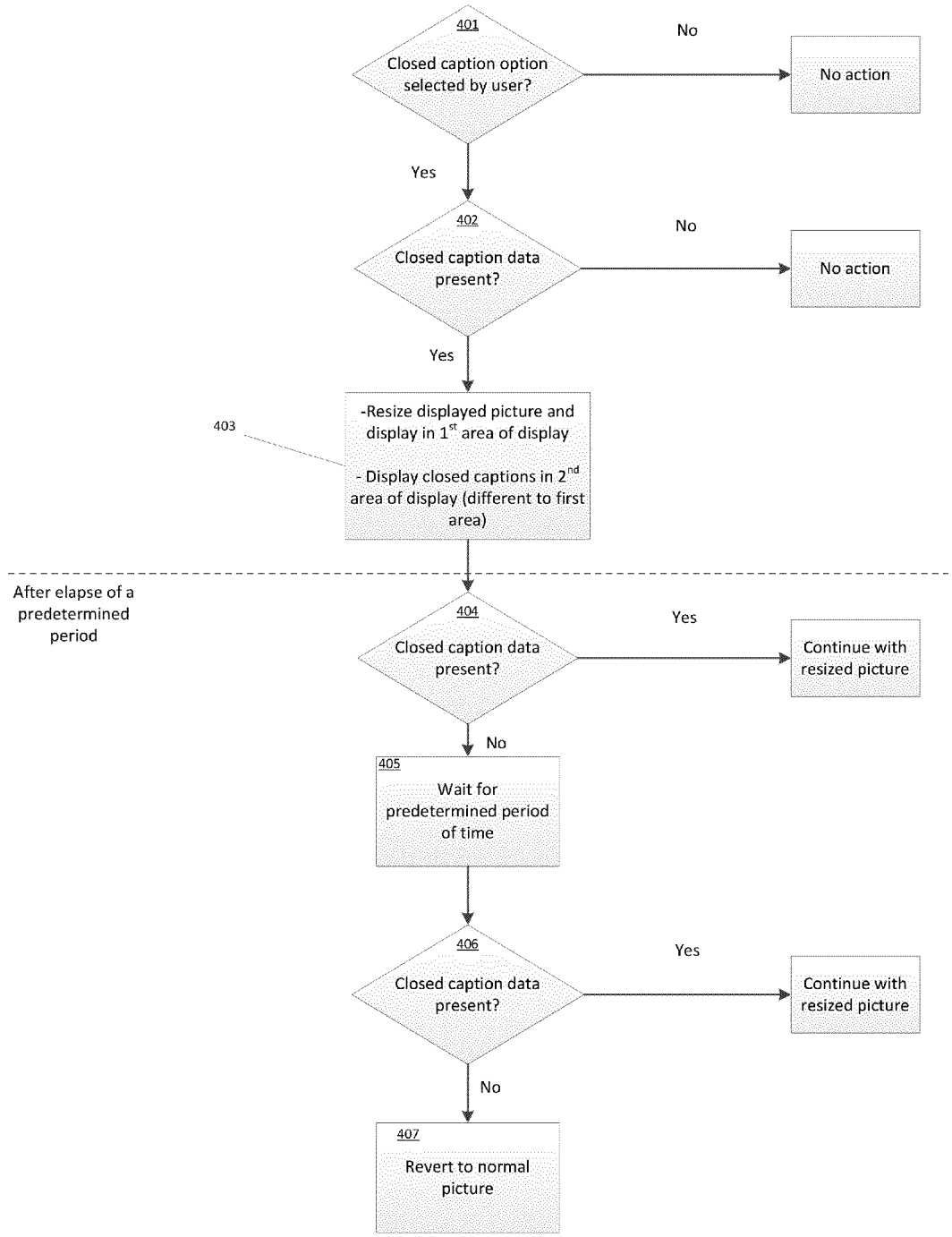
FIG. 4 shows the steps involved in a method according to an embodiment of the invention.

FIG. 4 shows the steps involved in a method according to an embodiment of the invention. At step 401 it is determined whether the user has selected the option to view closed caption text in conjunction with the picture, where this is available. If the user has not selected the option then no action is taken. If the user has selected such an option then, at step 402, it is determined whether any closed caption data is in fact present. This may be done according to the methods mentioned above, such as by detecting an appropriate flag in metadata, or otherwise. If no closed caption data is present, then no action is required, but if closed caption data is present then, at step 403, the video picture displayed on the screen is resized and positioned in a first area of the display, and the closed caption text is displayed in a second area of the display, different to the first area. In addition to these steps, it is preferred, as discussed above, that the system continuously or periodically undertakes the step of checking whether closed caption data is present. This can occur continuously or repeatedly, with each check being performed after a predetermined period of time. As shown in FIG. 4, at step 404 a further check is performed to determine whether closed caption data is present. If closed caption data is still present then the system continues with display of the resized picture and closed captions as resulting from the steps undertaken at 403. Preferably, if closed caption data is not present then the system waits for a predetermined period of time, at step 405, before further action is taken. The predetermined period of time may be the same period of time used between checks to determine whether closed caption data is present, or it may be a second different period of time. If, after the predetermined period of time has lapsed at step 405, and closed caption data has reappeared, then the system continues with the resized picture as resulting from the step 403. If closed caption data is no longer present then the system may revert to the normal picture, at maximum display size, without any closed caption data being displayed at step 407.

Alternatively, or in addition, to using a timer to determine when to resize the picture, intra frame signalling could be used to instruct the STB to exit the resizing display mode and to revert to a normal full size display, or to enter the resized display mode. This provides a mechanism to instruct the STB that closed caption text data is present for display, or has finished, allowing the option to signal to the STB to shrink/restore the video in response to a received signal. In this way, instead of waiting for the absence of closed captions for a predetermined time, as mentioned above, a signal may be provided by the content provider or service provider as part of the broadcast, separate to or encoded with the closed captions. For example, the closed caption text data itself may include a tag <<CCC>> (Closed Caption Concluded) that indicates the end of closed caption data, at least for a period of time. The system may be arranged to monitor or parse the closed caption text data for particular command tags such as the <<CCC>> tag. Detection of the tag <<CCC>> indicates that the screen can immediately be returned to full size, until the next closed caption is received. The system can thus be arranged to detect a tag such as <<CCC>> indicative of the inclusion of closed caption data, and to bypass or deactivate the combiner/resize unit accordingly to return the video screen to normal size. When further closed caption text data is detected in the stream, the picture resizing can be reactivated. A tag such as <<CCR>> (Closed Caption Resumed) may be provided to indicate when closed caption text is about to be received again, or received for the first time. Preferably upon detection of the <<CCC>> or <<CCR>> tag, this data is parsed out and is not displayed to the user in the closed caption display portion.

Embodiments may incorporate a resize indicator in the form of a flag or data bit into the transport stream, particularly into the metadata accompanying a given programme or other media content portion, such as within a program map table (PMT) or event information table (EIT). The CPU or closed caption data detector 302 may be configured to detect the flag, which is indicative of whether the associated programme or a particular portion of the programme, or some other portion of media content such as an advertisement, should be treated by the combiner/resize unit 204 before display or not. The flag, or resize indicator, can by seen as a means for bypassing the resizing of the video. This functionality can be seen as an alternative or possible addition to the other functionality described above.

Different programmes or portions of programmes can be marked differently, allowing the STB to automatically resize the screen as described above depending upon whether the media content portion should be displayed with closed captions separate to the video (resizing), without closed captions (if no closed captions are provided) or with closed captions overlaid on the video in the conventional manner. This allows a flexible approach. For example, a sports programme or news programme can be broadcast with the flag set such that the video is resized and content such as the ticker is not obscured. However, adverts between portions of the sports or news programmes may be broadcast without the flag set, or such that the flag/metadata indicates that resizing should not occur and any accompanying closed captions are overlaid on the video.

Figure 5:
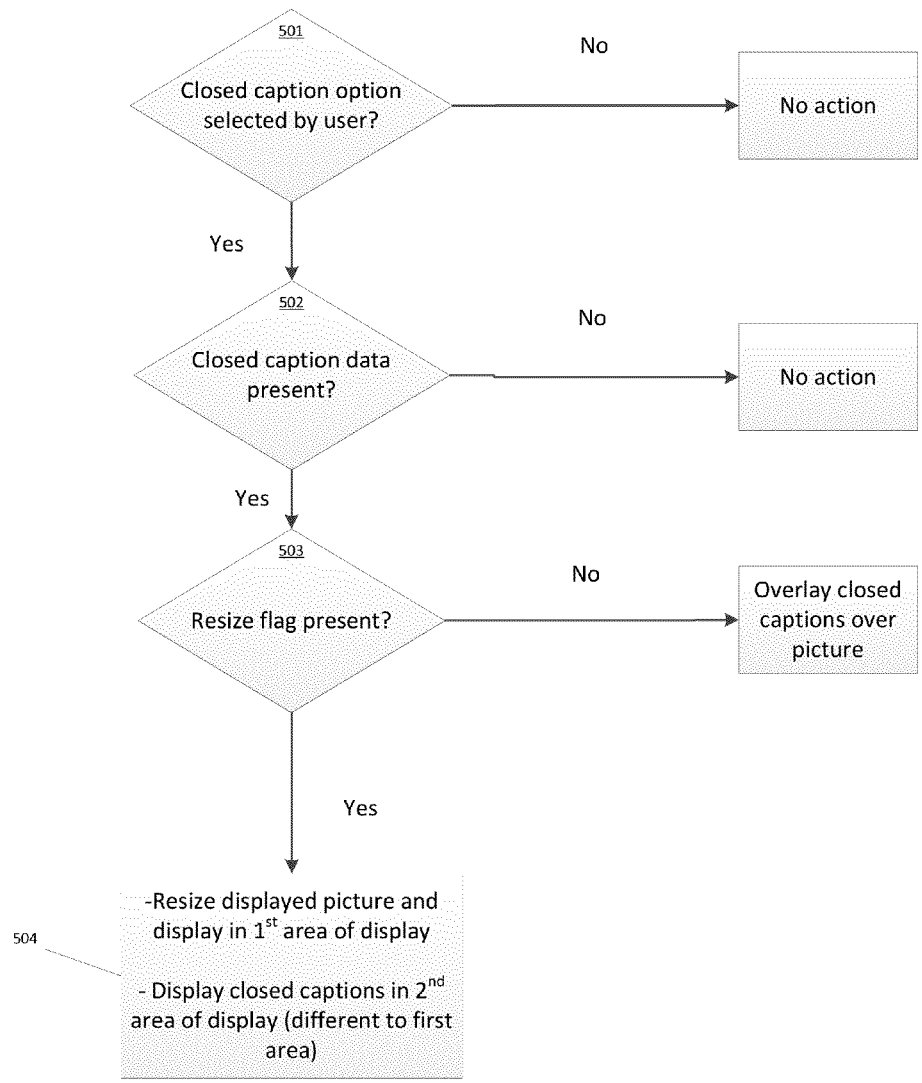
FIG. 5 shows the steps involved in a further method according to an embodiment of the invention.

An example of a method incorporating the closed caption flag is shown in FIG. 5. According to the method shown in FIG. 5, a check is first performed to determine whether the user has selected the closed caption display option. As with the method of FIG. 4, if the user has not selected this option then no action is taken, but if the user has selected this option then a check is performed at step 502 to determine whether closed caption data is present within the programme stream, or accompanying metadata. This can be performed by directly checking for text data or monitoring the text data for tags as mentioned above, or a combination of the two. Again, if there is no closed caption data present then no action is taken. However, if closed caption data is present the system performs a check to determine whether the closed caption "resize flag" is present at step 503. If the resize flag is not present, for example it has not yet been inserted by the broadcaster or service provider, then the system knows that the closed caption should be displayed in the known manner, by overlaying the closed captions over the video picture. However, if the resize flag is present then, at step 504, the display picture is resized and the closed captions are displayed in a different area, as described in the method of FIG. 4.

In various embodiments, whenever the video picture display size is altered, it is done in a smooth transitionary, or gradual, manner, or animated manner, rather than an instant transition.

Various embodiments have been described in relation to set top boxes for displaying multimedia content such as video or video and images. In particular, the invention finds utility in STBs that receive and descramble broadcast video and accompanying video data. However, it will be appreciated that embodiments of the invention might find utility in any device for displaying video and accompanying closed caption text. In particular, this may include DVD players or digital video recorders (DVRs) or video game consoles. Equally, it will be appreciated that the term "set top box" may include any device able to impart the required functionality to a television receiver, whether provided in a standalone box, incorporated in a standalone box with other devices, or integrated within the television, or television receiver itself. This would include televisions with inbuilt set-top-boxes, suitably programmed computers having the appropriate receiver functionality or connected to the internet or other network, mobile phones or similar mobile devices able to output media content, PDAs and so forth. The invention may also be embodied in a standalone closed caption decoded device which may be connected to a set-top-box for introducing closed captions.

What is claimed is:

1. A method executable by a device to display video content and associated text data that accompanies the video content on a display, the method comprising:
   receiving media content, including the video content for output to the display; and
   determining whether the associated text data is to be presented on the display;
   if the associated text data is not to be presented, outputting the video content to the display, the video content being output at a first size occupying a first area of the display;
   if the associated text data is to be presented, automatically resizing the video output to a second size such that the video content occupies a second area of the display, the second area being smaller than the first area, and automatically displaying the associated text data with the video, the text data being displayed in a third area of the screen distinct from the second area; and
   in response to subsequently determining that the associated text data is no longer to be presented:
     continuing to output the automatically resized video at the second size for a predetermined period of time;
     determining, after the predetermined period of time, whether the associated text data is present; and
     if closed associated text data is not present, resizing the output video to occupy the first area of the display.

2. A method according to claim 1 wherein if after the predetermined period of time, it is determined that closed caption data is present, the method further comprises continuing to output the automatically resized video output at the second size.

3. A method according to claim 1 wherein determining whether associated text data is to be presented includes determining whether associated text data is present within the media content, wherein if associated text data is not present, the video content occupies the first area of the display, and wherein if associated text data is present the video output is resized to occupy the second area and the associated text data is displayed in the third area.

4. A method according to claim 3 wherein the presence or absence of text data is determined by checking for a tag within the text data indicative thereof.

5. A method according to claim 1 further including the step of determining the status of a resize indicator within the media content, the resize indicator being indicative of whether the video output should be resized, and wherein resizing of the video output only occurs when the resize indicator status is set to resize mode.

6. A user device to display video and accompanying text data on a display, the device comprising:
   an input for receiving media content, including video content and associated text data;
   an output for providing the video content and associated text data to the display;
   a closed caption data detector arranged to determine whether associated text data is to be provided to the display; and
   a video resize unit arranged to resize the video output to the display; wherein the user device is arranged such that:
   in response to the closed caption data detector determining that text data is not to be provided to the display, video content is output at a first size such that it occupies a first area of the display; and in response to the closed caption data detector determining that text data is to be provided to the display the video resize unit resizes the video output to a second size different from the first size such that the video output occupies a second area of the display, the second area being smaller than the first area, and outputs the associated text data to a third area of the display distinct from the second area;

wherein the closed caption detector is arranged to bypass or deactivate the resize functionality in when the associated text data is no longer to be provided to the display; and wherein the closed caption data detector is arranged to receive a signal from a timer unit and to bypass or deactivate the resize functionality only when the absence of associated text data is detected for a predetermined period of time during which the video content is output at the second size.

7. A device according to claim 6 wherein the closed caption data detector is arranged to determine whether associated text data is present within received media content, wherein if associated text data is not detected, the video content is output such that it occupies the first area of the display, and wherein if associated text data is detected, the video resize unit resizes the video output such that it occupies the second area.

8. A device according to claim 7 wherein the closed caption data detector is arranged to detect the presence of a tag within the text data, the tag being indicative of whether associated text data is present or not.

9. A device according to claim 7 wherein the closed caption data detector is further arranged to detect and determine the status of a resize indicator within the media content, the resize indicator being indicative of whether the video output should be resized, and wherein the device is configured to resize the video output only when the resize indicator status is set to resize mode.

* * * * *